(12) United States Patent
Valenti et al.

(10) Patent No.: US 9,425,728 B2
(45) Date of Patent: Aug. 23, 2016

(54) DYNAMIC POWER CONTROL FOR INDUCTION MOTORS

(71) Applicant: V Square/R LLC, East Greenwich, RI (US)

(72) Inventors: Leo F. Valenti, East Greenwich, RI (US); James C. Daly, Ave Maria, FL (US); Thomas J. Valenti, North Kingstown, RI (US)

(73) Assignee: V Square/R LLC, East Greenwhich, RI (US)

( * ) Notice: Subject to any disclaimer, the term of this patent is extended or adjusted under 35 U.S.C. 154(b) by 0 days.

(21) Appl. No.: 14/931,368

(22) Filed: Nov. 3, 2015

(65) Prior Publication Data

US 2016/0056748 A1    Feb. 25, 2016

Related U.S. Application Data

(63) Continuation-in-part of application No. 14/210,773, filed on Mar. 14, 2014, now Pat. No. 9,397,603.

(60) Provisional application No. 61/912,016, filed on Dec. 5, 2013, provisional application No. 61/834,221, filed on Jun. 12, 2013, provisional application No. 62/101,753, filed on Jan. 9, 2015.

(51) Int. Cl.
*H02K 33/00* (2006.01)
*H02P 1/00* (2006.01)
(Continued)

(52) U.S. Cl.
CPC .............. *H02P 25/18* (2013.01); *H02P 23/14* (2013.01)

(58) Field of Classification Search
CPC .................................. H02P 25/18; H02P 23/14

USPC ......................................................... 318/126
See application file for complete search history.

(56) References Cited

U.S. PATENT DOCUMENTS

| 4,468,603 A | 8/1984 | Vander Meer et al. |
| 4,806,838 A | 2/1989 | Weber |

(Continued)

FOREIGN PATENT DOCUMENTS

| EP | 2 458 728 A2 | 5/2012 |
| RU | 2 498 490 C1 | 11/2013 |

OTHER PUBLICATIONS

International Search Report issued in co-pending International Application No. PCT/US2015/062360, ISA/RU, dated Mar. 17, 2016, 3 pages.

(Continued)

*Primary Examiner* — Erick Glass
(74) *Attorney, Agent, or Firm* — McDonnell, Boehnen, Hulbert & Berghoff LLP

(57) ABSTRACT

An example electric motor including a conductive winding, a switching device, a rotor, and a controller is disclosed. The switching device is configured to selectively energize, by an AC source, a first portion of the conductive winding in a first state and a second portion of the conductive winding in a second state. The conductive winding generates a magnetic field having a first strength in the first state and a second strength in the second state. The rotor magnetically interacts with the magnetic field such that a torque is applied to the rotor. The amount of torque applied is related to the strength of the magnetic field. The controller is configured to: (i) determine a metric indicative of a load condition of the electric motor; and (ii) based on the determined metric, cause the switching device to switch between the first state and the second state one or more times.

20 Claims, 7 Drawing Sheets

(51) Int. Cl.
  *H02P 3/00* (2006.01)
  *H02P 25/18* (2006.01)
  *H02P 23/14* (2006.01)

(56) References Cited

U.S. PATENT DOCUMENTS 5,077,512 A 12/1991 Weber
5,159,255 A 10/1992 Weber
5,757,162 A 5/1998 Weber
5,883,488 A 3/1999 Woodward
5,969,497 A 10/1999 McDonald et al.
6,242,884 B1 6/2001 Lipo et al.
6,639,338 B1 10/2003 Haner
2003/0038609 A1 2/2003 Shien
2012/0007570 A1 1/2012 Valenti et al.

OTHER PUBLICATIONS

Written Opinion issued in co-pending International Application No. PCT/US2015/062360, ISA/RU, dated Mar. 17, 2016, 4 pages.

DYNAMIC POWER CONTROL FOR INDUCTION MOTORS

CROSS-REFERENCE TO RELATED APPLICATIONS

This application is a continuation-in-part of U.S. patent application Ser. No. 14/210,773 filed on Mar. 14, 2014, which claims priority to U.S. Provisional Patent Application No. 61/912,016 filed on Dec. 5, 2013 and U.S. Provisional Patent Application No. 61/834,221 filed on Jun. 12, 2013, and this application also claims priority to U.S. Provisional Patent Application No. 62/101,753 filed on Jan. 9, 2015, the contents of these applications are incorporated by reference in their entireties.

FIELD

The present disclosure relates generally to inductive motors, and more particularly to systems and methods of regulating power consumed by, and output from, electric motors so as to conserve energy.

BACKGROUND

Unless otherwise indicated herein, the materials described in this section are not prior art to the claims in this application and are not admitted to be prior art by inclusion in this section.

An inductive motor converts electrical energy to mechanical energy via electromagnetic interactions that create torque on a shaft. An alternating current (AC) motor may include a stator surrounding a magnetically polarized rotor. The stator can include a structure on which a conductive winding is wound. The stator and winding are configured such that a rotating magnetic field is created within the stator when AC current flows through the winding. The rotor may include one or more permanent magnets or may be configured to become magnetized via inductive interaction with the stator's magnetic field (e.g., via conductive coils and/or ferromagnetic materials in the rotor). When an AC source is applied to the winding, the stator's magnetic field can cause the rotor to rotate relative to the stator. The rotor can be coupled to a shaft, which transfers the torque applied to the rotor, and the mechanical energy can then be used to perform work on a load. The rate at which work can be performed using the motor (i.e., the output power of the motor) is related to the torque magnetically applied to the rotor. The torque is proportionate to the strength of the magnetic field imparted on the rotor by the stator's winding. And the strength of the magnetic field is proportionate to the current through the winding, and the number of turns in the winding. The number of turns in the winding is a feature of the winding's geometry, and the current depends on the resistivity of the wire used, the inductance of the winding, and the voltage of the AC source.

Typical AC inductive motors used, for example, in compressors, fans, and a variety of other household appliances and electronics are designed to operate under maximum anticipated load conditions, and to do so even when supplied with less than a nominally expected AC driving voltage. Providing for a tolerance in the AC driving voltage helps ensure reliable operation of the motor when supplied with a line voltage that is less than the nominally expected value. For example, a motor may be designed to drive a maximum anticipated load when supplied with a line voltage of about 105 VAC, rather than 120 VAC.

To provide such a tolerance in AC driving voltage, a motor designer first determines the magnetic field strength necessary to provide a target output power level. The motor designer then selects a stator with a conductive winding that will conduct a sufficient amount of current to provide the necessary magnetic field strength. As noted above, the magnetic field strength is proportionate to the current through the stator's winding, which is itself proportionate to the AC driving voltage. Thus, to account for the voltage tolerance, the conductive winding is formed of wire with a resistivity sufficient to conduct a desired amount of current (e.g., an amount sufficient to provide the necessary magnetic field strength) while driven with the reduced AC voltage rather than the nominally expected voltage. As such, a typical motor's windings are over-sized for operation at the nominal AC voltage, and generally conduct more current than actually necessary, which wastes energy. For example, the stator winding may use a lower gauge wire than necessary to generate the desired magnetic field strength when supplied with the nominally expected AC driving voltage.

The efficiency of an AC motor can be expressed by a ratio of the electrical power consumed (e.g., the product of voltage and current supplied to the motor from the AC source) and the actual power delivered to a load to perform work. The ratio of consumed power to volt-amperes of delivered power is referred to as a motor power factor. For typical motors, the power factor varies depending on the power consumed, but also varies depending on the load being driven. In most cases, a motor operates with its greatest power factor when under maximum loaded conditions, because a relatively small fraction of the consumed power is dissipated as eddy currents or resistive heating. By contrast, when the motor is not under maximum load, the motor consumes relatively more excess energy. The excess energy is dissipated as heat (e.g., due to eddy currents in the stator structure or resistive heating in the coils). Essentially, when a motor is only partially loaded, the excess energy that is not used to perform work is simply wasted.

For example, a typical motor rated for ⅓ horsepower may draw about 5 amperes from a 120 VAC source when fully loaded and operate around 3,500 revolutions per minute (RPM) with about 70-80% power factor or better. Yet, even under virtually no load, the same motor may continue to draw about 3.8 amperes, although with a reduced power factor of about 20-30%. It is under the unloaded condition (or under a state of reduced load) where considerable excess electric power is wasted because of the decreased efficiency of the motor under such conditions. To a large extent, the decreased efficiency is caused by the eddy-current and resistive losses noted above.

SUMMARY

An example electric motor includes a conductive winding, a switching device, a rotor, and a controller. The switching device is configured to selectively energize, by an AC source, a first portion of the conductive winding in a first state and a second portion of the conductive winding in a second state. The conductive winding is configured to generate a magnetic field having a first strength when the switching device is in the first state and a second strength in the second state. The rotor magnetically interacts with the magnetic field such that a torque is applied to the rotor. The amount of torque applied is related to the strength of the magnetic field. The controller is configured to: (i) determine a metric indicative of a load condition of the electric motor; and (ii) based on the determined metric, cause the switching device to switch between the first state and the second state one or more times.

In some aspects, the present disclosure provides an electric motor that includes a conductive winding, a switching device, a rotor, and a controller. The conductive winding includes a plurality of turns, a first terminal, a second terminal, and a third terminal. A first number of the plurality of turns are between the first terminal and the third terminal. A second number of the plurality of turns are between the second terminal and the third terminal. The first number can be different from the second number. The switching device can be configured to selectively conduct power from the AC source to the first terminal in a first state and the second terminal in a second state. With the switching device in the first state, the conductive winding generates a first magnetic field responsive to the AC source conducting power to the first terminal. With the switching device in the second state, the conductive winding generates a second magnetic field responsive to the AC source conducting power to the second terminal. The rotor can be configured to magnetically interact with first and second magnetic fields generated by the conductive winding such that a torque is applied on the rotor. The controller can be configured to determine a metric indicative of a load condition of the electric motor. The controller can also be configured to cause the switching device to switch between the first state and the second state one or more times based on the determined metric.

In additional or alternative aspects, the present disclosure provides a method of regulating an amount of power delivered to a load via magnetic induction by a conductive winding. The method can include causing the conductive winding to generate a first magnetic field having a first strength by energizing a portion of the conductive winding from an alternating current (AC) source. The method can also include determining a metric indicative of a ratio of power between (i) power delivered to the conductive winding from the AC source and (ii) power consumed by the load. The method can further include determining that the metric is within a threshold range. Additionally, the method can include causing the conductive winding to generate a second magnetic field having a second strength, wherein the first strength is different from the second strength responsive to the determination that the metric is within the threshold range.

In additional or alternative aspects, the present disclosure provides an electric motor that includes a conductive winding, a switching device, a rotor, and a controller. The switching device can be configured to selectively conduct power to a conductive winding of the electric motor from (i) a first AC source having a first voltage level in a first switch state and (ii) a second AC source having a second voltage level in a second switch state. The first voltage level is different from the second voltage level. With the switching device in the first state, the conductive winding generates a first magnetic field having a first strength. With the switching device in the second state, the conductive winding generates a second magnetic field having a second strength. The first strength can be different from the second strength. The controller can be configured to determine a metric indicative of a ratio of power between power delivered to the conductive winding from the AC source and power consumed by the load. The controller can also be configured to determine that the metric is within a threshold range. The controller can further be configured to cause the switching device to switch between the first state and the second state one or more times responsive to the determination that the metric is within the threshold range.

These as well as other aspects, advantages, and alternatives, will become apparent to those of ordinary skill in the art by reading the following detailed description, with reference where appropriate to the accompanying drawings.

DETAILED DESCRIPTION

Figure 1:
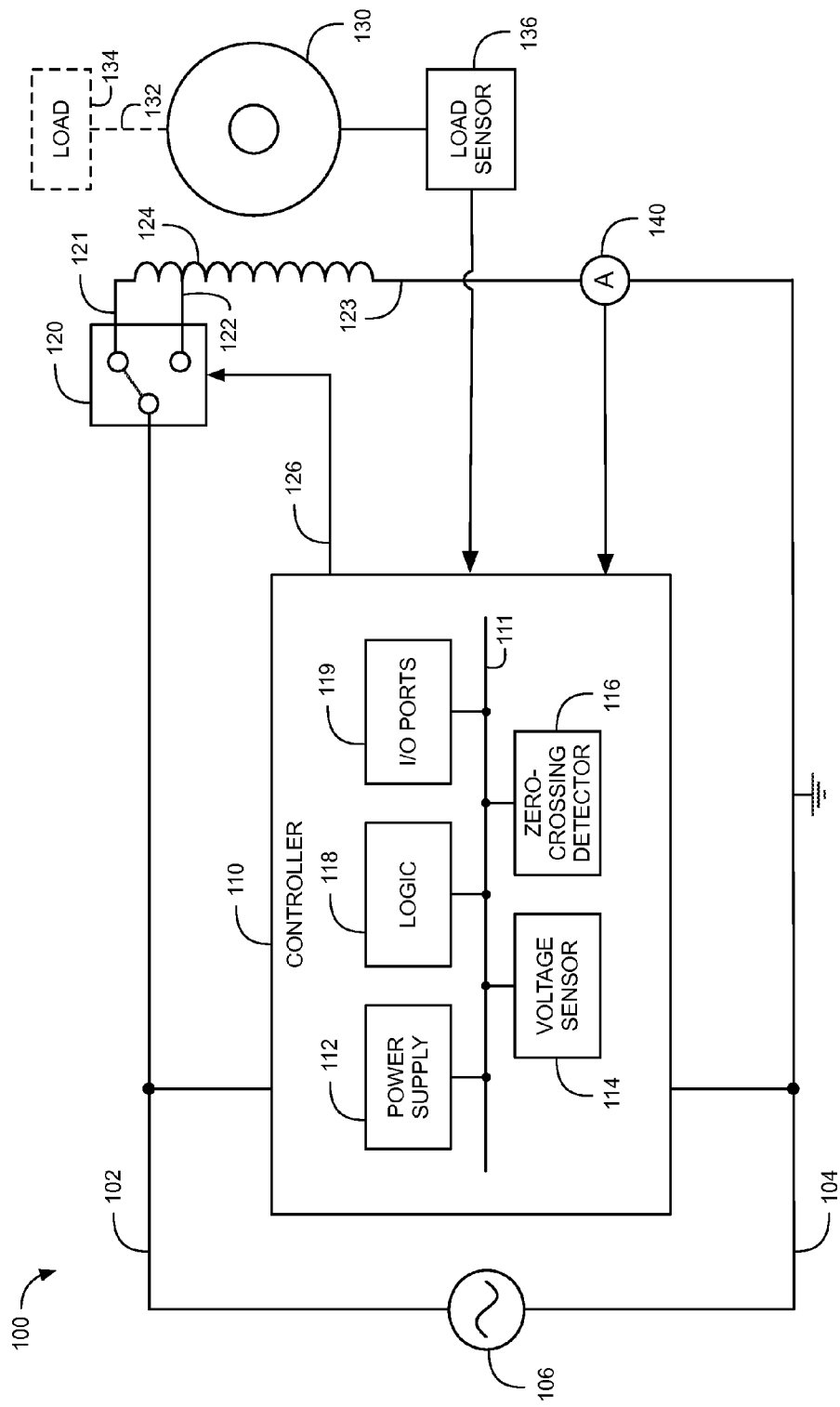
FIG. 1 is a diagram of an example electric motor with a three-terminal conductive winding, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An electric motor may include conductive windings and a rotor arranged such that, while alternating current flows through the windings, a rotating magnetic field is generated which may apply a torque on the rotor. The strength of the generated magnetic field is directly proportionate to the amount of current flowing through the conductive windings. Thus, the amount of current flowing through the conductive windings is related to the amount of torque applied on the rotor.

More specifically, the rotating magnetic field produced by the conductive windings induces a current flow on conductive elements of the rotor, which in turn generates its own magnetic field. The rotor's magnetic field applies forces on the rotor itself, which collectively produce the torque that causes the rotor to rotate. As the rotor speeds up and approaches the rate of rotation of the magnetic field generated by the conductive windings, the current induced through the conductive elements of the rotor decreases. If the rotor's rotational speed matches the rate of rotation of the magnetic field, no current is induced through the rotor's conductive element, and therefore no torque is applied to the rotor.

Because the amount of power consumed by a load coupled to the rotor is related to the torque applied to the rotor, it is also related to the amount of current flowing through the rotor's conductive element. Thus, the amount of power consumed by the load relates to the rotor's speed. In circumstances where rotor experiences a heavy load and slows down, the power drawn by the rotor from the conductive windings is large.

Conversely, when the rotor is coupled to a light load or no load, the power drawn by the rotor from the conductive windings is small.

For an ideal electric motor, this operating principle would imply that the motor only draws an amount of power required to spin the rotor up to a synchronous speed, and that, once at the synchronous speed, no power is drawn from the power source. However, even if the rotor is operating at near-synchronous speeds, real world motors experience power losses in a variety of ways. Many components have parasitic reactance, some degree of resistivity, and experience eddy currents, all of which contribute to undesirable power dissipation.

One way to reduce such power losses is to reduce the amount of current flowing through the conductive windings—and therefore the strength of the magnetic field generated by the conductive windings—while the rotor is unloaded or in a state of reduced load. In one example embodiment, an electric motor can include a conductive winding with a center tap. Because there are fewer turns between the center tap and the output terminal compared to the number of turns across the entire conductive winding, the inductance from the center tap to output is less than the total inductance of the conductive winding. As a result, energizing the conductive winding through the center tap generates a stronger magnetic field than if the entire conductive winding were energized. Embodiments utilizing multi-tap conductive windings and/or two or more series-connected conductive windings may be referred to herein as "Autocycle" motors.

A controller can be configured to operate switching devices for selectively energizing either the center tap, or the entire conductive winding. The controller can be coupled to sensors to detect a load condition of the electric motor. If the electric motor is under heavy load, the controller can cause the center tap of the conductive winding to be energized to in turn provide a sufficient amount of torque to turn the rotor. If the electric motor is under a light load or no load, the controller can cause the entire conductive winding to be energized to reduce the amount of power dissipated by various components without sacrificing operating performance of the motor.

In some instances, a metric indicative of a load condition may be the power factor of the electric motor. The power factor may be indicative of the electric motor's efficiency at a particular point in time. More specifically, the power factor may indicate (or be related to) a ratio between the amount of power delivered to the conductive winding and the amount of power consumed by the load at a point in time. The controller can receive measurements of the voltage and current across various components, the speed of the rotor, and/or measurements from other sensors in order to calculate, detect, or otherwise determine the power factor. In some examples, the controller can activate one or more switching devices in response to the power factor being above or below a threshold, or within a threshold range.

In another example embodiment, an electric motor may be connected to multiple AC sources having varying voltage levels. For example, an electric motor can be connected to an AC source and a step-down transformer (e.g., a buck transformer) coupled to that AC source to provide a nominal voltage level and a reduce voltage level, respectively. A controller can detect the load condition of the electric motor and selectively couple one of the AC sources to a conductive winding. If the electric motor is under heavy load, the controller may couple the nominal voltage AC source to the conductive winding, which induces a relatively large current to flow through the conductive winding to in turn provide the torque for driving the rotor. If the electric motor is under light load, the controller may couple the reduced voltage AC source to the conductive winding, which reduces the current flowing through the conductive winding to in turn reduce the amount of power dissipated by the electric motor without sacrificing operating performance of the motor (i.e., to reduce wasted energy). Embodiments utilizing multiple AC source voltage sources, AC source input transformers, and/or autotransformers may be referred to herein as "Transcycle" motors.

In some instances, a rotor may require an amount of power to drive a load that is between the two power levels, such that one power level is too large and results in unnecessary power dissipation, and the other is not large enough to produce the requisite torque to drive the load. In some example embodiments, a controller can be configured to switch between the two power levels according to a switching pattern, such that the net power delivered to the conductive winding is between the two power levels. The controller can accurately determine the load condition and perform switching between two or more power levels to match (or approximately match) the power needed to drive the load. Such switching techniques can be applied to Autocycle motor embodiments and Transcycle embodiments.

Some implementations may utilize three or more power levels to provide for more granular output power control. For Autocycle motor implementations, a conductive winding can include multiple taps at various points along the winding, where a different strength magnetic field is produced depending on which tap is coupled to the AC source. Alternatively or additionally, the conductive winding can include two or more separate conductive windings connected to each other in series. For Transcycle motor implementations, multiple transformers, an autotransformer, and/or other voltage-varying means can be utilized to provide multiple voltage levels that may be coupled to the motor's conductive winding. The difference in magnetic field strength produced between two conductive winding taps or between two different AC voltage source levels may vary, depending upon the particular implementation.

Some additional or alternative implementations may employ a combination of multiple power levels (using multi-tapped conductive windings, multiple AC source voltage levels, or some combination thereof). Such multi-level power implementations may be combined with the above-mentioned switching techniques to enable even more precise power control.

As one specific example, an electric motor with a center-tapped conductive winding may be capable of switching between a 100% power level (i.e., the maximum available power level for this particular example) by energizing the center tap, or a 50% power level by energizing the entire conductive winding. An AC source may operate at 60 Hz. A controller can be configured to switch between the two power levels every half-cycle (e.g., up to 120 times per second). The controller can be configured to operate the switches according to a set of predetermined switching patterns that allow for 9 different power levels—from 55% to 95% in 5% increments. In this configuration, such an electric motor may be capable of delivering, for example, 65% power by alternately energizing the center tap for 30% of a switching pattern period, and the entire conductive winding for 70% of the switching pattern period. While 5% increments may be an adequate level of granularity in some circumstances, others might require or otherwise benefit from more precise power control. Thus, different power level increments can be employed in other examples.

As another specific example, an electric motor with a conductive winding having two end terminals and 5 taps might be capable of switching between power levels of 100%, 90%, 80%, 70%, 60%, or 50%, depending on which taps or terminals are energized. A controller configured similarly to the previous example—with 9 different switching patterns—would allow for 9 different intermediate power levels in between each of the conductive winding taps. For example, 63% power delivered to the conductive winding can be achieved by switching between the 60% tap (for 70% of the switching pattern period) and the 70% tap (for 30% of the switching pattern period). Thus, granular power output control for an electric motor can be achieved using some combination of multi-tapped conductive windings and controlled switching.

During operation, the controller can receive various sensor measurements from which the motor's efficiency may be determined, and use those measurements as a basis for selecting a tap or taps to energize (or for selecting an AC source voltage level), either without switching or in accordance with some switching pattern, in order to match or approximately match the power consumed by the load. As such, the controller may be configured to map power factor values to switching patterns. Referring back to the 1% increment electric motor example above, if the controller determines the power factor at some point in time to be 0.75, the controller may select the corresponding switching pattern (e.g., switching between the 70% tap for half of the switching pattern period and the 80% tap the other half of the switching pattern period) to deliver 75% power to the conductive winding. This process of evaluating the motor's efficiency and adjusting the output power at the conductive winding may be repeated periodically (e.g., multiple times per second) so that the output power can rapidly react to changing load conditions.

The controller can also mitigate distortion of the AC source waveform, and associated radio frequency interference (RFI), by turning the switch on and off as the AC current crosses through zero. At zero current, the energy stored in the conductive winding is zero, and so the conductive winding can be connected to the AC source (or disconnected from the AC source) without rapidly discharging energy to or from the conductive winding. Such rapid discharge events may occur, for example, upon connecting the conductive winding during a portion of the AC waveform that is not a current zero-crossing. The rapid discharge causes a spike in current drawn from the AC source (and voltage inductively generated across the winding), which both distorts the AC waveform and generates RFI. For a periodically varying AC waveform, such as a sinusoidal waveform, the current crosses through zero twice each full cycle of the waveform (one positive-to-negative zero-crossing, and another negative-to-positive zero-crossing). And so the motor can react to real time measurements on time scales on the order of a cycle or half-cycle of the AC waveform frequency (e.g., for a 60 Hz sinusoidal AC driving voltage, every $1/120$ seconds).

The controller can incorporate therein or be coupled to sensors configured to detect, measure, or otherwise sense a variety of conditions on the AC source (or sources), conductive winding (or windings), switching devices, the rotor, and/or the load. For example, an ammeter may be coupled to the output of the conductive winding to measure the current flowing through the conductive winding, As another example, a voltmeter may be coupled across the conductive winding to measure the voltage across the conductive winding. These voltage and current measurements can be provided to the controller and serve as a basis for control. For instance, the relative phase between the voltage and current at a given point in time can be used to determine the power factor, As yet another example, the motor can include a tachometer fir measuring the rotational speed (and/or phase) of the rotor. The rotor's speed relative to a reference speed (which can be determined or predetermined based on the AC source frequency and the stator configuration of the electric motor) may be indicative of the rotor's slip. This slip may be indicative of a load condition of the rotor, from which the power factor may be derived or inferred. For example, if the slip is approximately zero, the rotor is almost synchronously spinning with the rotating magnetic field. In this scenario, a high speed measurement—indicating almost no slip—indicates a lower power factor because the load is consuming very little power. Thus, as described herein, a "load condition," "power factor," or any similar term may refer to some metric with which the electric motor's extent of loading or efficiency may be determined.

Switching devices as described herein can be interfaced with a controller that generates command signals to cause the switching device to open and close. The switching device can be a semi-conductive device, such as a transistor (e.g., a GANFET, MOSFET, IGBT, etc.), or another type of semi-conductive device, such as a thyristor or a TRIAC. Switching devices utilized in various implementations can also be physical switches, such as relays and contactors. Regardless of the implementation, a switching device can switch between a conductive state and a non-conductive state based on a command signal, such as an applied voltage. The controller can generate the command signals for activating and/or deactivating various switches, sometimes in a timed manner, in order to carry out a particular switching pattern. The command signals for activating and deactivating switches may be coincident with current zero-crossings to effect zero current switching (ZCS).

In some implementations, the controller may be an electrical circuit including a variety of electric devices (e.g., transistors, resistors, capacitors, counters, comparators, integrated circuits, etc.) that collectively carry out the switching as described herein. In other implementations, the controller may be an application-specific integrated circuit (ASIC) configured for a particular electric motor configuration or design. Further, the controller may be a microcontroller or processor interfaced with a storage medium and configured to carry out program instructions stored within the storage medium, the operation of which may be updated, adjusted, or otherwise modified by changing the program instructions.

Some example embodiments can perform switching at current half-cycles in order to effect ZCS. For example, a power source providing a 60 Hz voltage may induce a 60 Hz current signal (which may be out-of-phase with the voltage by some phase angle). Such a current signal may oscillate such that the current crosses between positive and negative 120 times per second (i.e., 60 crossings from positive to negative and 60 crossings from negative to positive). The controller can be interfaced with a current measurement device (e.g., an ammeter), the output of which may be provided to the controller to detect the current zero-crossings. The controller can be configured to trigger switching responsive to detecting such current zero-crossings.

II. Example Autocycle Electric Motors

FIG. 1 is a diagram of an example electric motor 100 with a three-terminal conductive winding 124. The conductive winding 124 includes an input terminal 121, a tap 122, and an output terminal 123. When current flows through conductive winding 124, a magnetic field is generated that causes the rotor 130 to rotate via a magnetic interaction that applies torque on the rotor 130. The rotor 130 transfers rotational energy to perform work on a load 134 through a mechanical coupling 132 (e.g., a shaft, a belt, gears, etc.). The motor 100 also includes a controller 110 that operates a switch 120 for selectively energizing either the input terminal 121 or the tap 122 with the AC source 106.

The power lines 102, 104 supply power to the motor 100 from an electricity mains line. The power line 102 may carry a voltage that varies periodically with respect to the voltage of power line 104. The periodically varying voltage may be an AC voltage distributed by electricity distribution systems. For example, have a sinusoidal waveform with a voltage of about 120 VAC and a frequency of about 60 Hz, as employed on the United States electricity grid. Although alternative sinusoidal waveforms may be used, such as a voltage of about 230 VAC and a frequency of about 50 Hz, as employed on the European electricity grid. Other examples may also be possible.

2a) Conductive Winding

The AC power lines 102, 104 provide power to energize the conductive winding 124. Current flows through the conductive winding 124, which generates a magnetic field that interacts with the rotor 130 to cause the rotor 130 to rotate. For example, while energized, the conductive winding 124 may generate a rotating magnetic field. To facilitate interaction with the generated magnetic field, the rotor 130 can then include a permanent magnet or a conductive coil that inductively interacts with the conductive winding's time-changing magnetic field. While the particular arrangement selected may take variety of different forms, the magnetic features of the rotor 130 and the conductive winding 124 are arranged such that the magnetic field generated by the energized conductive winding 124 applies a torque on the rotor 130.

The entire conductive winding 124 has a total number of turns across input terminal 121 and output terminal 123, and a reduced number of turns across tap 122 and output terminal 123. The total number of turns define an inductor having a larger inductance compared to the reduced number of turns such that, when an AC source is connected to the conductive winding, a larger current flows across the reduced number of turns compared to the entire conductive winding. When the switch 120 couples the AC source 106 to the tap 122 of the conductive winding 124, current flows across the reduced number of turns, producing a full strength magnetic field. When the switch 120 couples the AC source 106 to the input terminal 121 of the conductive winding 124, current flows across the total number of turns, producing a reduced strength magnetic field. The controller 110 can thereby adjust the strength of the magnetic field, and thus the output power of the motor 100, by operating the switch 120.

As one example, the conductive winding 124 may have a total number of 100 turns across the entire conductive winding 124 (i.e., from the input terminal 121 to the output terminal 123) and a reduced number of 80 turns across the portion of the conductive winding 124 defined by the tap 122 and the output terminal 123. Because the reactance (due to inductance) across the 100 turns in greater than the inductance across the 80 turns, applying a voltage across the 80 turns produces a greater current compared to applying that same voltage across the 100 turns. In this example, if the load condition of the motor 100 is such that energizing the entire conductive winding will at least provide the minimum power to drive the rotor 130, the controller 110 may trigger the switch 122 to energize the conductive winding 124 at the input terminal 121. In additional or alternative examples, a variety of other conductive windings having any number of taps defining inductors having any number of turns can be employed to enable various magnetic field strength levels.

2b) Controller

The controller 110 functions to dynamically adjust the current conveyed to the conductive winding 124 based at least in part on real time voltage measurements of the AC source. The controller 110 may, for example, obtain a measurement of the AC source voltage, determine whether to energize the input terminal 121 or the tap 122 to provide a target output power level from the motor 100, and then generate a suitable control signal 126 to operate the switch 120 in accordance with the determination.

The controller 110 may be implemented with a variety of different technologies to perform the functions described herein. FIG. 1 depicts a particular implementation, in which the controller 110 includes a power supply module 112, a voltage sensor 114, a zero-crossing detector 116, a logic module 118, and an interface port 119, all of which may be communicatively linked to each other via a system bus, network, or other connection mechanism 111. The controller 110 is also electrically coupled to the power lines 102, 104, to facilitate voltage measurements (via voltage sensor 114), AC waveform zero-crossing detections (via zero-crossing detector 116), and also to provide power to the controller (via power supply 112).

The power supply module 112 can include a voltage rectifier and/or voltage regulator that draws power from the AC power lines 102, 104 and generates a rectified DC voltage to power the remaining components of the controller 110. The power supply module 112 may thus supply a DC voltage to the voltage sensor 114, the zero-crossing detector 116, the logic module 118, and/or the interface port 119.

The voltage sensor 114 obtains an indication of the voltage across the AC power lines 102, 104. The voltage sensor 114 may be implemented in accordance with a variety of technologies. In some cases, the voltage sensor 114 may operate as a peak voltage detector, or as a root mean square (RMS) voltage sensor. In one example, the voltage sensor 114 may include a circuit with one or more operational amplifiers or the like that sample the voltage between the lines, 102, 104 in combination with an analog-to-digital converter that generates a digital representation of the measured voltage. A series of such measurements can then be communicated to other components of the controller 110, such as the logic module 118.

The zero-crossing detector 116 functions to estimate the timing at which the current of the AC waveform crosses through zero. The zero-crossing detector 116 may be implemented in accordance with a variety of technologies. The zero-crossing detector 116 may include a current sensor, such as a transimpedance amplifier, a hall effect sensor, etc., in combination with an analog-to-digital converter that generates a digital representation of the measured current. A series of such measurements can then be communicated to other components of the controller 110, such as the logic module 118. The zero-crossing detector 116 may be interfaced with the ammeter 140 or another current sensor within the motor 100.

The zero-crossing detector 116 may also detect zero-crossings using a series of logical gates that transition between low and high outputs as the waveform transitions between positive and negative current, the gates can be combined to output a series of voltage pulses that are each substantially coincident with a current zero-crossing of the AC waveform.

As noted below, the controller 110 can then use the timing of the AC waveform current zero-crossings, as indicated by the zero-crossing detector 116, to time the operation of the switch 120. In practice, the controller 110 can function such that the switch 120 opens or closes substantially coincident with a current zero-crossing of the AC waveform. As such, the tap 122 can be energized (e.g., operating the switch 120 to conduct to tap 122) or can stop being energized (e.g., operating the switch 120 to conduct to input terminal 121) while the current through the conductive winding 124 is zero (and the current through the AC power lines 102, 104 is also zero). At zero current, the magnetic field of the conductive winding 124 is zero, which means the conductive winding 124 also has zero stored energy. By switching between the tap 122 and the input terminal 121 while the conductive winding 124 has zero stored energy, the motor 100 avoids rapid discharges of energy to or from the conductive winding 124.

By contrast, connecting or disconnecting terminals of the conductive winding 124 while the AC power lines 102, 104 conduct a non-zero current, would lead to an immediate spike in current to rapidly source or sink current as necessary to bring the conductive winding current into agreement with the AC waveform 102, 2014. Among other factors, such current spikes generate radio frequency interference (RFI), and other forms of electromagnetic interference (EMI), which can interfere with other electronics components. The current spikes resulting from non-zero current switching can also lead to harmonic noise on the mains lines 102, 104 due to voltage across the conductive winding 124 created by the rapid current change, which is then applied to the AC power lines 102, 104. The current spikes can also mitigate performance of the motor 100, because the conductive winding's magnetic field strength contribution is proportionate to the current through the conductive winding, and so a current spike rapidly increases or decreases the magnetic field strength of the conductive winding, and may even temporarily unbalance or otherwise destabilize the motor 100. It may thus be beneficial to employ the zero-crossing switching described above; however, non-zero crossing switching may be used in other examples.

The logic module 118 can be implemented in accordance with a variety of technologies. The logic module 118 can include a processor executing program instructions to perform the functions described herein. Such a processor can be a general purpose or special purpose processor implemented according to a variety of different technologies. And such program instructions can be stored, for example, on a non-transitory computer readable medium included in the controller 110 or otherwise associated with the controller 110. Additionally or alternatively, the logic module 118 can include a combination of logic gates and other components such as counters, comparators, inverters, and the like incorporated in a field programmable gate array, an application specific integrated circuit, or the like.

Regardless of implementation, the logic module 118 functions to cause the controller 110 to provide the control signal 126 to the switch 120 such that the switch 120 operates in a manner that causes the motor 100 to provide a target output power level. In practice, the logic module 118 receives indications of measurements obtained with the voltage sensor 114 and zero-crossing detector 116. The logic module 118 then determines whether to energize the conductive winding 124 at the tap 122, or the input terminal 121, based in part on the obtained voltage measurement. The logic module 118 can, for instance, determine a total amount of ampere-turns needed to generate a magnetic field with sufficient strength to provide the target output power level via magnetic interaction with the rotor 130.

The logic module 118 may then determine, based on the measured voltage of the AC power lines 102, 104, the amount of current needed to flow through the conductive winding 124 (or the magnetic field strength to be provided by the conductive winding 124). The logic module 118 may then determine whether energizing the tap 122 or the input terminal 121 better achieves the determined current or magnetic field strength (or at least provides a minimum amount of current or a generates a minimum strength magnetic field). Alternatively or additionally, the logic module 118 may determine a switching pattern between the tap 122 and the input terminal 121 that approximately achieves the determined amount of current or magnetic field strength.

The logic module 118 can then determine to energize the tap 122 or the input terminal 121 based on the determination of whether the conductive winding's ampere-turns (or magnetic field strength) is sufficient for achieve the target output power level. And the logic module 118 then causes the interface port to provide the corresponding control signal 126 to either open or close the switch 120 at the next current zero-crossing of the AC waveform (as indicated by the zero-crossing detector 116). So, at least in some example embodiments, the logic module 118 may operate such that the decision whether to open or close the switch 120 is based at least in part on a measurement from the voltage sensor 114, and the timing at which the switch 120 is caused to open or close is based at least in part on a measurement from the zero-crossing detector 116.

The interface port 119 outputs the control signal 126 that operates the switch 120. The interface port 119 may be implemented in accordance with a variety of technologies. The control signal 126 may be a logical high voltage or a logical low voltage, such as in implementations in which the switch 120 is a semiconductive device. And the interface port 119 may set the control signal 126 in accordance with the determination made by the logic module 118 to either set the switch 120 to connect to the input terminal 121, or the tap 122.

In addition, the logic module 118 may also determine whether to energize the tap 122 or the input terminal 121 based on the current drawn by the conductive winding 124. As the driven load 134 increases, the rotor 130 tends to slip more relative to the generated magnetic field, which induces additional current to the conductive winding 124. In such an arrangement, the current drawn by the conductive winding 124 increases as the load 134 increases, which increases may be due to a variety of transient factors. Without intervening, and without regard to the AC voltage on the power lines 102, 104, the motor 100 would "overload" and the conductive winding might burn-out or otherwise experience deleterious thermal effects associated with drawing a greater current than intended given the reactance of the entire conductive winding 124. Thus, the logic module 118 may function to monitor the current drawn by the conductive winding 124, and switch from energizing the input terminal 121 to energizing the tap 122 upon measuring a current through the conductive winding 124 exceeding a threshold value (where a reduced inductance would permit the greater current flow).

In this manner, the controller 110 can thus dynamically adjust the state of the switch 120 to maintain a target output power level based on real time (or near-real time) measurements of the AC voltage and/or the current drawn by the conductive winding 124. The controller 110 may operate by making a series of real time determinations of whether to energize the conductive winding 124 at the input terminal 121 or the tap 122, for a given combination of measured AC voltage, target output power level, and/or current drawn by the conductive winding 124. However, the controller 110 may also operate by switching between energizing the input terminal 121 and the tap 122 according to a particular switching pattern (which may effect a particular duty cycle) that is selected to achieve, on average, a target output power level of the motor 100. The controller 110 may therefore determine the desired time-average current (or desired time-average magnetic field strength) that provides a corresponding desired average contribution to the output power of the motor. And then the controller 110 can cause the switch 120 to switch between energizing the input terminal 121 and the tap 122 according to a switching pattern (or a duty cycle) that provides the desired time-average contribution. The controller 110 can therefore send command signals 126 to the switch 120 to repeatedly (or periodically) switch between the two states such that the ratio between the time in which the input terminal 121 is connected and the time in which the tap 122 is connected achieves the target switching pattern (or target duty cycle). As such, the output power provided by the conductive winding 124 can be scaled in accordance with the rate of switching between the tap 122 and the input terminal 121. Such an operation scheme therefore allows for more precise control over the time-average power level (and by extension, the power consumption) in comparison to a strictly dual mode approach of either fully energizing the conductive winding 124 or completely disconnecting the conductive winding 124.

The load sensor 136 may be any sensing device capable of sensing, measuring, or otherwise determining some metric indicative of a load condition on the rotor 130. As one example, the load sensor 136 can be a tachometer configured to measure the frequency of rotation of the rotor 130 (e.g., in rotations per minute (RPMs)). From a measured frequency of rotation, the controller 110 can determine the rotor's extent of loading, the rotor's slip, and/or the efficiency of the electric motor. As another example, the load sensor 136 can be a torque sensor configured to convert torsional mechanical input into an electrical signal. A torque sensor may measure an amount of torque applied at the rotor, from which the controller 110 can determine the motor's efficiency, extent of loading, etc. A variety of other sensors (or some combination of sensors) may be implemented within the load sensor 136, the output of which may be provided to the controller 110 to serve as a basis for controlling switching devices.

While not shown in FIG. 1, the motor 100 can also include an additional starting winding that provides a phase-delayed magnetic field, which combines with the conductive winding 124 to initiate rotation of the rotor 130. Such a starting winding may be phase delayed by a reactance different from the conductive winding 124, for example. In some cases, the starting winding may be automatically turn off once the rotor 130 achieves a predetermined rotation speed, which may be facilitated by a centrifugal switch or the like. The motor 100 may also include a main power switch that turns the motor 100 on and allows power to flow from the AC supply lines 102, 104 to the conductive winding 124 and controller 110. Many other variations and deviations for the various components disclosed in connection with FIG. 1 are also possible without departing from the scope of the present disclosure.

Figure 2:
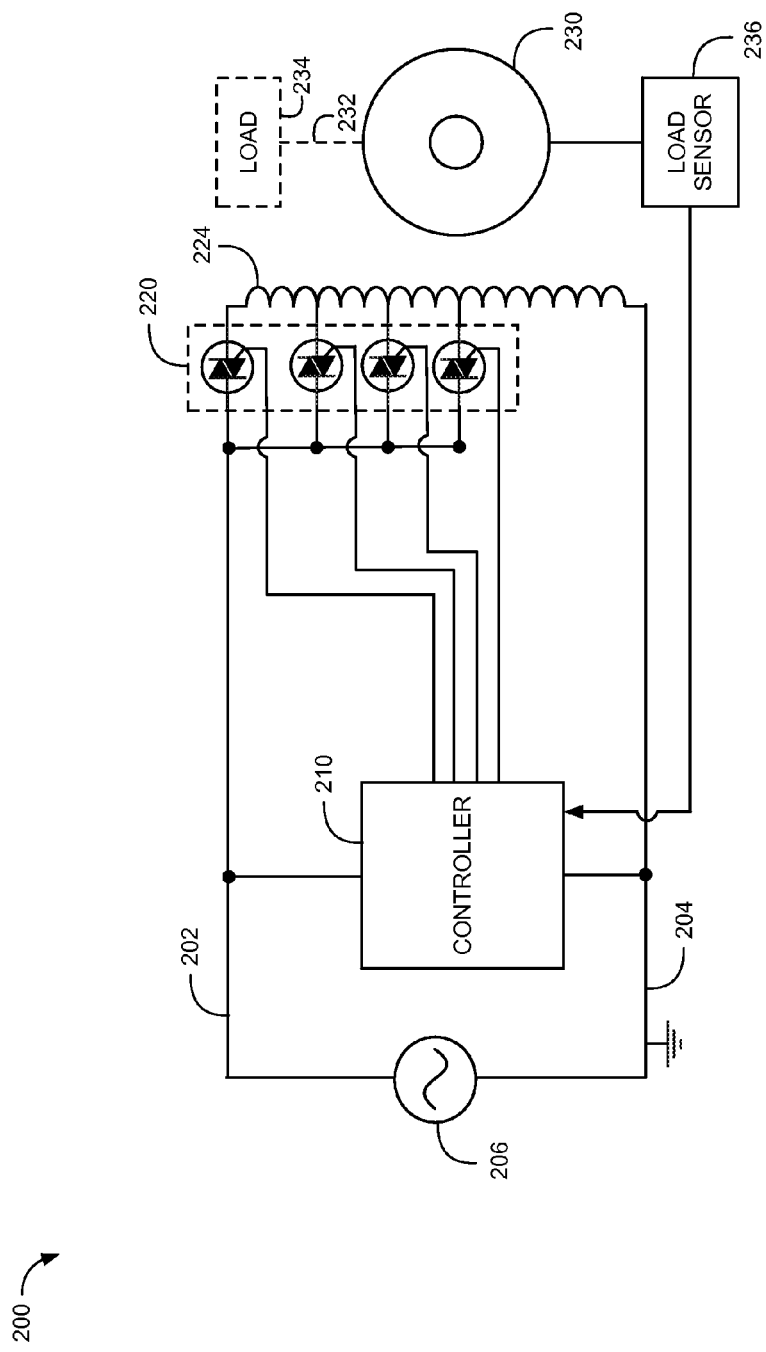
FIG. 2 is a diagram of an example electric motor with a multi-terminal conductive winding, according to an example embodiment.

In various implementations, one or more conductive windings—each of which may contain any number of taps—may enable an electric motor to provide multiple output power levels by selectively energizing one of the taps (or the input terminal). The selective energizing may be accomplished by controlling one or more switching devices with a controller. FIG. 2 illustrates one such example electric motor 200 with a multi-terminal conductive winding 224.

The motor 200 includes a switching assembly 220 configured to allow one of the taps (or the input terminal) of the conductive winding 224 to be selectively energized. In this example, each of the switching devices within the switching assembly 220 may operate in two states: a conducting state in which current flows from the AC source 206 along the AC power line 202 into the respective tap, and a non-conducting state in which the respective tap is decoupled from the AC power line 202. The controller 210 can be configured to send command signals that only allow for one switching device within the switching assembly 220 to be in the conducting state at a given time, such that the corresponding tap is selectively energized (while the other taps are connected to non-conducting switches). The switching devices within the switching assembly 220 can be contactors, relays (e.g., spring-based or solid state), or TRIACs, among other electrical or electro-mechanical switches. The controller 210 may be the same as or substantially similar to the controller 110 (including any combination of components in controller 110), and may be modified to control the switching assembly 220.

During operation, the controller 210—receiving measurements from sensors coupled to electrical and/or mechanical components of motor 200—may determine a target output power level (e.g., for improving the efficiency or increasing the power factor of the motor 200). The controller 210 may include program logic or a logic module (which may be similar to logic module 118) that determines a switching pattern that approximately achieves, as a time-average, the target output power level. Then, the controller 210 may send command signals to the switching devices in the switching assembly 220 to carry out that switching pattern (which may include duty cycle-based switching, or providing a constant connection to one of the taps on the conductive winding 224). This process of evaluating the load condition, determining the switching pattern, and carrying out the switching pattern can be repeated periodically to account for changes in the load condition over time.

It should be understood that "tap" and "input terminal" may be used interchangeably herein as they relate to conductive windings. An input terminal—which may refer to the terminal opposite the output terminal—may also be referred to as a "tap."

III. Example Transcycle Electric Motors

Figure 3:
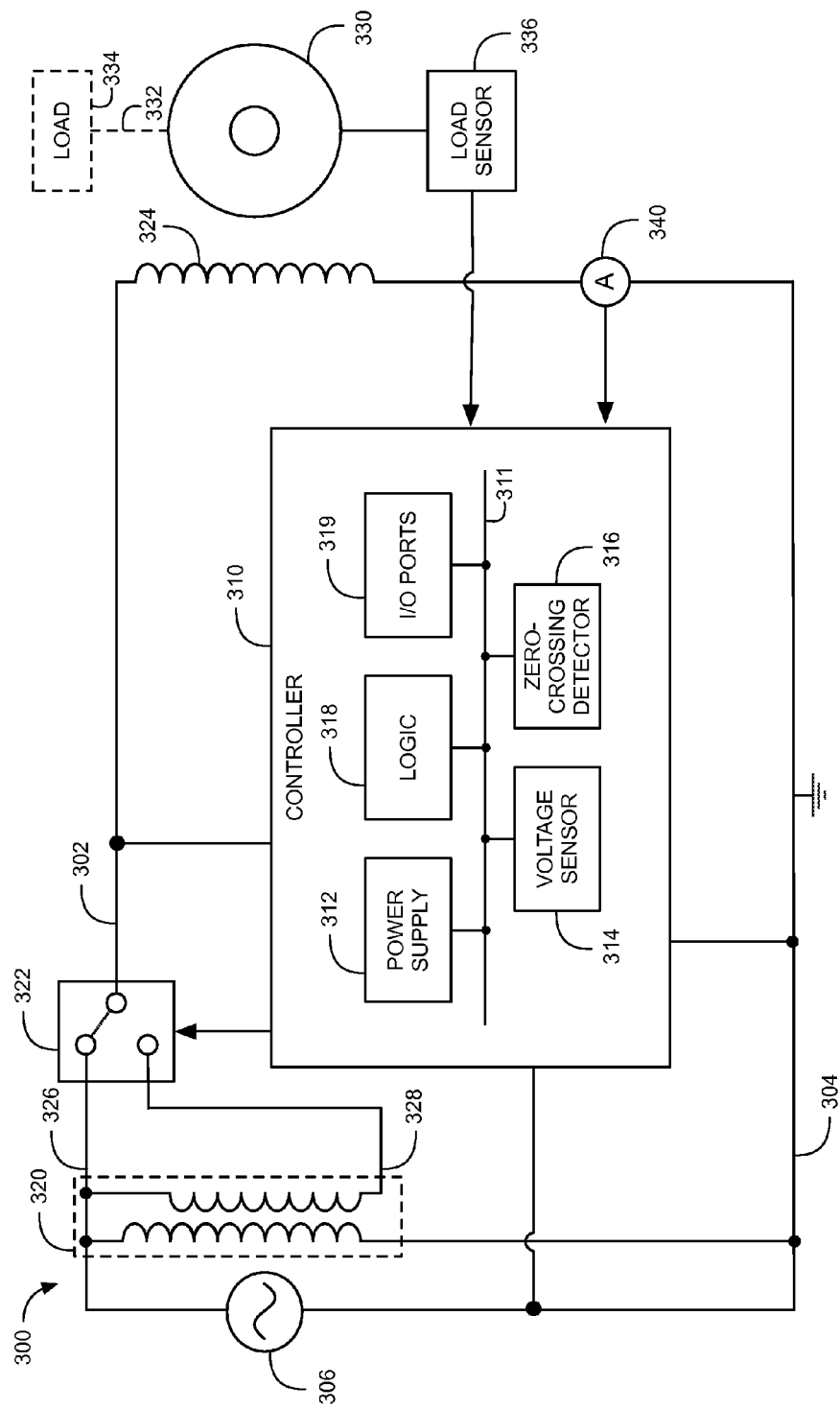
FIG. 3 is a diagram of an example electric motor with two different AC source voltage levels, according to an example embodiment.

FIG. 3 is a diagram of an example electric motor 300 with two different AC source voltage levels 326, 328. The AC source voltage level 326 is a direct connection to the AC source 306, and may be referred to as a "nominal" voltage level. The AC source voltage level 328 may be an output of a step-down transformer 320, and may be referred to as a "reduced" voltage level. The AC power line 302 may be selectively connected to either the nominal voltage level 326 or the reduced voltage level 328 by a switch 322. The controller 310 may send command signals to the switch 322 to set the switch state of the switch 322. The controller 310 may include the same or similar components as the controller 110. Additionally, a rotor 330, a mechanical coupling 332, a load 334, and a load sensor 336 shown in FIG. 3 may be similar to the rotor 130, mechanical coupling 132, load 134, and the load sensor 136, respectively, described above.

The power lines 302, 304 supply power to the motor 300 from one of the voltage source levels 326, 328. The power line 302 may carry a voltage that varies periodically with respect to the voltage of power line 304. The periodically varying voltage provided by the AC source 306 may be an AC voltage distributed by electricity distribution systems. For example, have a sinusoidal waveform with a voltage of about 120 VAC and a frequency of about 60 Hz, as employed on the United States electricity grid. Although alternative sinusoidal waveforms may be used, such as a voltage of about 230 VAC and a frequency of about 50 Hz, as employed on the European electricity grid.

3a) AC Power Sources

When the AC power line 302 is connected to the nominal voltage level 326, a nominal voltage is applied to the conductive winding 324. This, in turn, causes a nominal current to flow through conductive winding 324, thereby generating a magnetic field having a nominal strength. When the AC power line 302 is connected to the reduced voltage level 328, a reduced voltage is applied to the conductive winding 324. This, in turn, causes a reduced current to flow through conductive winding 324, thereby generating a magnetic field having a reduced strength.

In one example configuration, the nominal voltage level 326 may provide an AC voltage of 120 V, whereas the reduced voltage level 328 may provide a stepped-down AC voltage of 96 V (e.g., if the winding ratio of the step-down transformer is 4:3). In this configuration, coupling the reduced voltage level 328 to the conductive winding 324 would generate a current level that is 75% of a current that would be produced by coupling the nominal voltage level 326 to the conductive winding 324. Varying the amount of current flowing through the conductive winding 324 varies the ampere-turns generated by the conductive winding 324, which in turns varies the strength of the magnetic field. Other examples are also possible.

3b) Controller

The controller 310 may perform operations similar to the controller 110 for dynamically adjusting the current conveyed to conductive winding 324 based at least in part on voltage measurements, current measurements, and/or other measurements from which the motor's efficiency or power factor can be determined, derived, or inferred. The controller 310 can, for example, determine whether to energize the conductive winding 324 from the nominal voltage level 326 or the reduced voltage level 328 to provide a target output power level from the motor 300, and then generate a suitable control signal to operate the switch 320 in accordance with the determination. Additionally or alternatively the controller 310 may provide a target output power level between the output power level produced from the nominal voltage level 326 and the reduce voltage level 328 by switching between the two levels in accordance with a switching pattern.

The controller 310 may perform similar computations, calculations, or determinations as described above in order to determine a metric indicative of the motor's efficiency or power factor. Any switching pattern carried about by controller 310 can be aligned with the current waveform (e.g., such that the controller 310 effects zero-current switching).

While only a single AC source 306 is illustrated in FIG. 3, which provides power to both the nominal voltage level 324 and the reduced voltage level 326, other implementations may utilize two separate AC source (which may each provide for different voltage levels). Additionally, while two voltage levels are utilized in the example of FIG. 3, other implementations may utilize more than two voltage levels.

Figure 4:
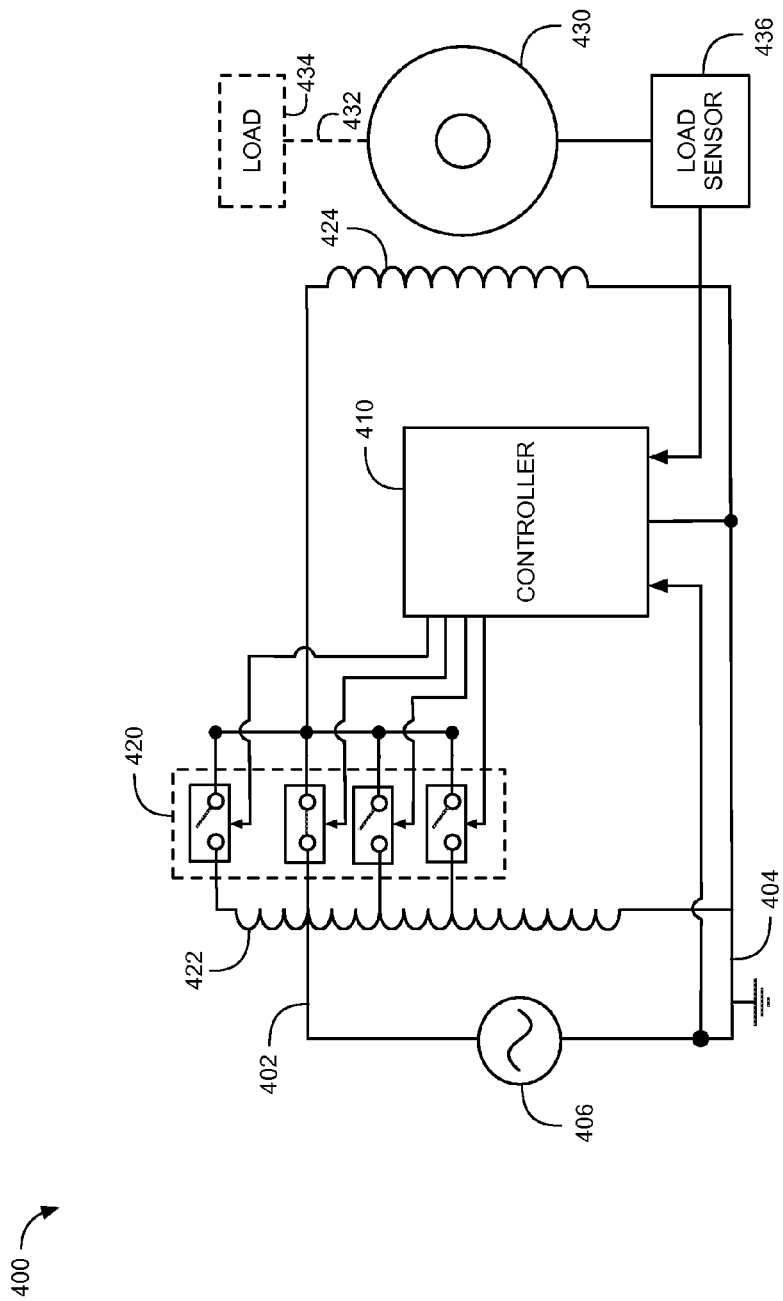
FIG. 4 is a diagram of an example electric motor with multiple AC source voltage levels, according to an example embodiment.

In various implementations, one or more AC voltage levels may enable an electric motor to provide multiple output power levels by selectively coupling one of the AC voltage levels to the conductive winding. The selective coupling may be accomplished by controlling one or more switching devices with a controller. FIG. 4 illustrates one such example electric motor 400 with an autotransformer 422.

The motor 400 includes a switching assembly 420 configured to allow one of the taps of the autotransformer 422 to be selectively coupled to the conductive winding 424. In this example, each of the switching devices within the switching assembly 420 may operate in two states: a conducting state in which current flows from a respective autotransformer tap to the conductive winding 424, and a non-conducting state in which the respective tap is decoupled from the conductive winding 424. The controller 410 can be configured to send command signals that allow for one of switching device within the switching assembly 420 to be in the conducting state at a given time, such that the corresponding tap is selectively coupled to the conductive winding 424 (while the other taps are connected to non-conducting switches). The switching devices within the switching assembly 420 can be contactors, relays, TRIACs, or any other electric or electro-mechanical switches. The controller 410 may be the same as or substantially similar to the controller 310 (including any combination of components in controller 310 and/or controller 110), and may be modified to control the switching assembly 420.

The autotransformer 422 can be a transformer with a single conductive winding that includes a primary side coupled to the AC source 406, and a secondary side including one or more taps (in this example, 4 taps). The voltage output at a given tap may be a step-up, a step-down, or the same as the voltage level provided by the AC source 406. For example, the tap positioned at the top of the FIG. 4 may provide an increased voltage level beyond the nominal voltage level provided by the AC source 406, since the number of turns across the primary side is less than the number of turns across the secondary side. The tap below the top-most tap in FIG. 4 may provide the nominal voltage level, since the number of taps on both the primary side and secondary side are equivalent. The lower two taps illustrated in FIG. 4 may provide reduced voltage levels, since the number of taps on the primary side is greater than the that of the secondary side. The voltage level (or RMS voltage level) may be proportionate to the ratio of turns between the primary side and secondary side of the autotransformer 422.

During operation, the controller 410 may receive measurements and determine a target output power level (e.g., for improving the efficiency or increasing the power factor of the motor 400). The controller 410 may store a mapping between target output power levels and switching patterns, such that a switching pattern may be carried out responsive to determining the target output power level. A switching pattern for controller 400 may involve time-based switching, involving coupling and/or decoupling of various switches in the switching assembly 420 that, when averaged over a duration of time, produces the target output power level.

In other implementations, the autotransformer 422 may be replaced with a set of transformers configured to provide various voltage levels (either increased from or reduced from the AC source 406). For example, the AC source 406 can be connected to two or more distinct transformers, each of which provides a different voltage output level. As another example, a given transformer output can be cascaded with another transformer to further step-up or step-down the voltage. As yet another example, other AC sources in addition to the AC source 406 can be connected to or included in the motor 400, each of which provides a different voltage output. Regardless of the implementation, an "AC source" as described herein may be grid power, an AC mains power, a generator, an AC source device (e.g., an inverter connected to DC power), or any device connected thereto to step-up, step-down, or otherwise regulate an AC source voltage output.

IV. Example Operations

Figure 5:
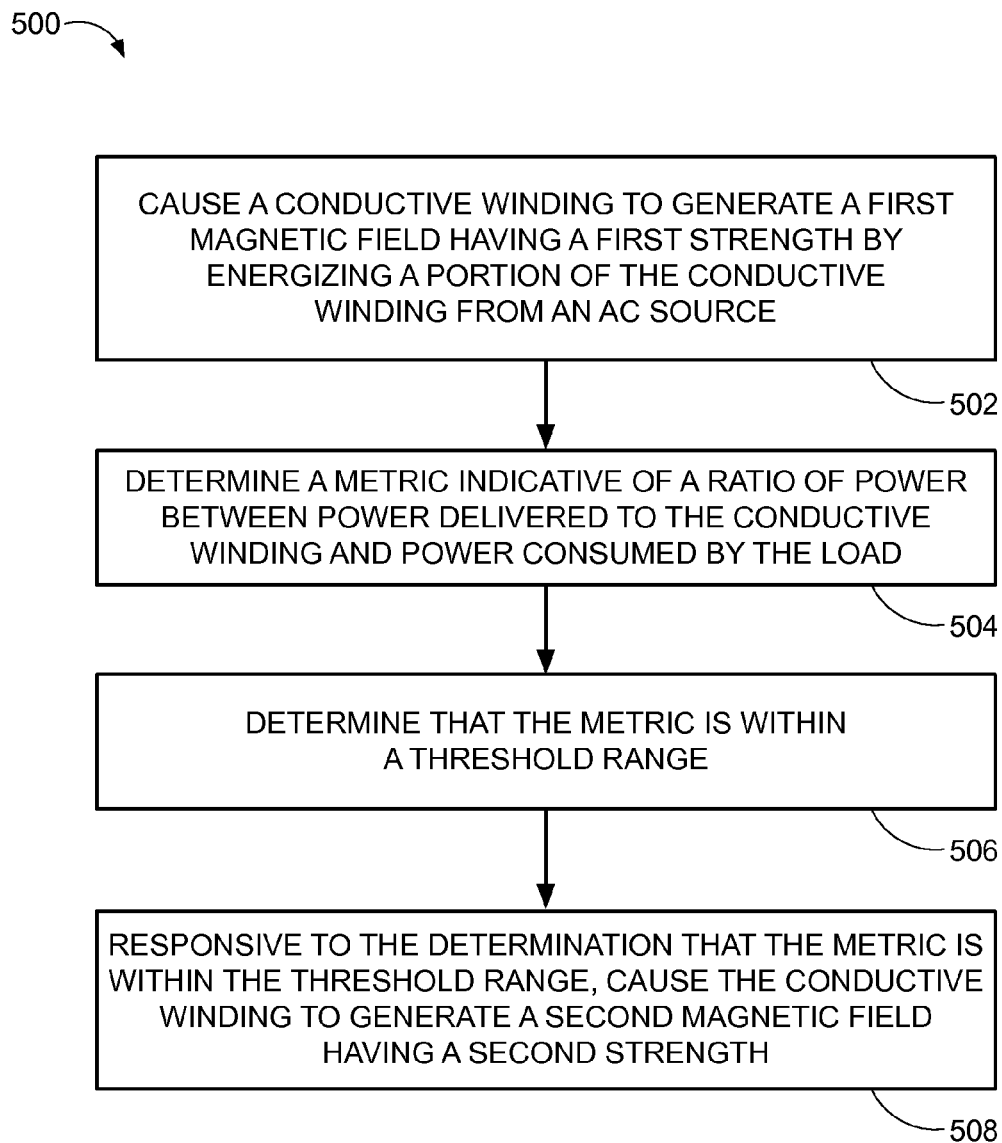
FIG. 5 is a flowchart of an example process for operating an electric motor, according to an example embodiment.

FIG. 5 is a flowchart of an example process 500 for operating an electric motor. The process 500 is described in connection with the motor 100 of FIG. 1 for example purposes, although it is recognized that the process 500 may be performed using any of the motors described herein, including variations of those motors and/or motors that combine one or more features described separately in connection with the various motors.

At block 502, a controller causes a conductive winding to generate a first magnetic field having a first strength by energizing a portion of the conductive winding from an AC source. For example, the controller 110 may send a command signal to switch 120 to cause it to couple the AC source 106 to tap 122. As current flows through the portion of the conductive winding 124 defined by the tap 122 and the output terminal 123, the conductive winding 124 generates a magnetic field, the strength of which depends upon the amount of current flowing through the conductive winding 124.

At block 504, the controller determines a metric indicative of a ratio of power between power delivered to the conductive winding and power consumed by the load. For example, this metric may be determined based on one or more measurements from one or more sensors on the electric motor. As one example, the metric may be the power factor of the electric motor 100. In some implementations, the power factor may be determined by measuring—either directly or indirectly— the power delivered to the conductive winding and the power consumed by the load. Power at a component may be determined as a time-averaged product of voltage and current across a particular component. In additional or alternative implementations, the power factor may be determined from other measurements or determinations, such as the rotor's slip. For instance, the controller 110 may include predetermined mappings between the slip of the rotor 130 and the power factor, in some instances. In this manner, measuring the rotor's frequency of rotation may provide an indication of the efficiency of the motor 100.

In additional or alternative implementations, the power factor may be determined based on a relationship between the current waveform and voltage waveform at the conductive winding 124. The controller 110 may receive measurements of voltage—either from across the conductive winding 124, or from the AC source 106—and measurements of current (e.g., through the ammeter 140). The controller 110 may determine a length of time between a voltage zero-crossing and a proceeding current zero-crossing. Based on this determined length of time and the frequency of the waveforms, the controller 110 may determine a phase angle between the voltage and current. From this, the controller 110 may perform a trigonometric calculation (e.g., taking the cosine of the phase angle) to determine the power factor. Using this technique, no sensors are required at the load to determine the power factor.

Other metrics may also be used to determine the ratio of power between power delivered to the conductive winding and power consumed by the load. For example, the efficiency of the electric motor may be determined by measuring the torque at the load, heat generated by the electric motor, or from the net strength of the electromagnetic field (which may be attenuated due to back EMF). These measurements may be recorded by the load sensor 136, for example. The efficiency may additionally or alternatively be determined, at least in part, by directly measuring the power dissipated across certain components (e.g., due to the resistivity or parasitic reactance of components, among other causes of power dissipation).

Further, the power factor may be normalized, averaged, or otherwise combined with other measurements. For instance, the power factor may be determined using two separate methods, and then the two power factor calculations can be combined. This technique may mitigate sensor noise or errors in measurements.

At block 506, the controller determines that the metric is within a threshold range. For example, the controller 110 may determine that the metric is below a threshold, where the threshold range may be defined as zero up to a threshold value. The controller 110 may additionally or alternatively determine that the metric is above a threshold, where the threshold range may be defined as a threshold value up until a maximum possible threshold (e.g., a power factor of 1). Further, the controller 110 may additionally or alternatively determine that the metric is within a threshold range spanning from a lower bound to an upper bound. One or more of these threshold ranges may be predetermined and mapped to a particular conductive winding tap, AC source voltage level, a switching pattern between two conductive winding taps, and/or a switching pattern between two AC source voltages.

Referring back to the 1% increment multi-tap example above, a threshold range may be from a power factor from 0.62 (non-inclusive) to 0.63 (inclusive), which may be mapped to a switching pattern that effects a 63% target power output level. If the controller 110 determines the power factor to fall within this threshold range, the controller 110 sends command signals to carry out the designated switching pattern. Note that this is simply an example power factor to target power output level mapping; other implementations may provide for a different mapping. Where such metric threshold range to switching pattern mappings are predetermined, the controller 110 may periodically recalculate the metric and adjust the switching pattern according to the mapping.

At block 508, the controller causes the conductive winding to generate a second magnetic field having a second strength responsive to the determination that the metric is within the threshold range. For Autocycle motor implementations, the controller may selectively energize a tap of the conductive winding, or alternately energize two taps of the conductive winding according to a switching pattern, in order to generate the second magnetic field. For Transcycle motor implementations, the controller may selectively couple the conductive winding a particular AC source, or alternately switch between two AC source voltage levels according to a switching pattern, in order to generate the second magnetic field. Regardless of the implementation, block 508 may involve either no switching, a single switching event, or multiple switching events (possibly according to a particular switching pattern or duty cycle) to generate the second magnetic field having a second strength.

Many functions described herein may be implemented in hardware, firmware, or software. Further, software descriptions of the disclosure can be used to produce hardware and/or firmware implementing the disclosed example embodiments. According to some example embodiments, software and/or firmware may be embodied on any known non-transitory computer-readable medium having embodied therein a computer program for storing data. In the context of this disclosure, computer-readable storage may be any tangible medium that can contain or store data for use by, or in connection with, an instruction execution system, apparatus, or device. For example, a non-volatile computer-readable medium may store software and/or firmware program logic executable by a processor to achieve one or more of the functions described herein in connection with FIGS. 1-4. Computer-readable storage may be, for example, an electronic, magnetic, optical, electromagnetic, infrared, or semiconductor system, apparatus, or device, or any suitable combination of the foregoing. More specific examples of computer-readable storage would include but are not limited to the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Further, although aspects of the present disclosure have been described herein in the context of a particular implementation in a particular environment for a particular purpose, those of ordinary skill in the art will recognize that its usefulness is not limited thereto and that the present disclosure can be beneficially implemented in any number of environments for any number of purposes.

In view of the exemplary systems described above, methodologies that may be implemented in accordance with the described subject matter will be better appreciated with reference to the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, it should be understood and appreciated that the methodologies could alternatively be represented as a series of interrelated states via a state diagram or events. Additionally, it should be appreciated that the methodologies described in this disclosure are capable of being stored on an article of manufacture to facilitate transporting and transferring such methodologies to computing devices.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

V. Example Switching Patterns

Figure 6:
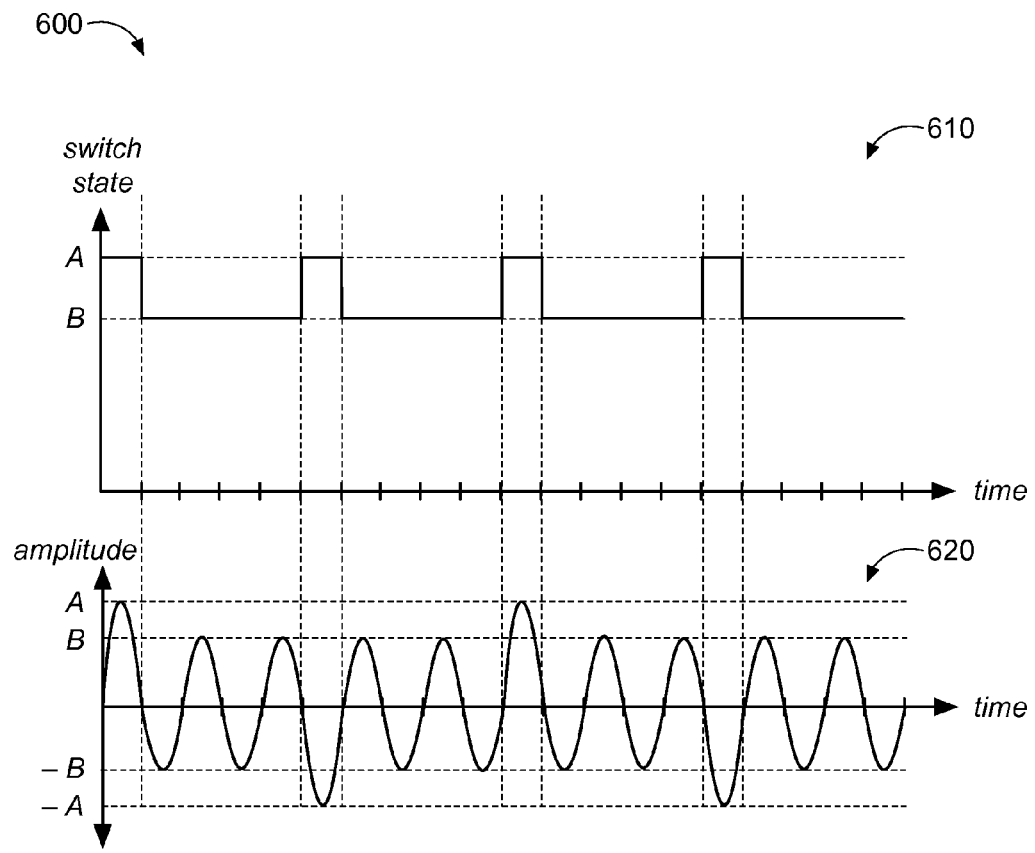
FIG. 6 is a graphical depiction of a switching pattern and a corresponding current waveform, according to an example embodiment.

FIG. 6 is a graphical depiction 600 of a switching pattern 610 and a corresponding current waveform 620, according to an example embodiment. In this example, a switching device (or devices) can be in one of two states: state A, or state B. State A is indicative of a switching device conducting AC power to a conductive winding tap (across a reduced number of turns, such that output power is greater); state B is indicative of a switching device conducting AC power to a different tap (across a greater number of turns, such that output power is reduced). As applied to motor 100 in FIG. 1, for example, state A may be the switch 120 conducting to tap 122, whereas state B may be the switch 120 conducting to input terminal 121.

The switching pattern 610 indicates that the switching device is in state A for one half cycle, then in state B for four half cycles, and then repeating (where half cycles are represented by the ticks along the time axis). Put differently, the switching pattern 610 represents a 20% duty cycle in state A and an 80% duty cycle in state B. Switching according to switching pattern 610 would provide an output power level that is a one-fifth fractional increase in power between the output power level in state B and the output power level in state A. In other words, if state B provided an 80% output power level and state A provided a 100% output power level, operating the switching device according to switching pattern 610 would provide an output power level of 84% (the fractional increase of one-fifth of 20% being 4%).

In FIG. 6, the corresponding current waveform 620 is time-aligned with the switching pattern 610 in order to illustrate the effect of the switching on the current flowing through a conductive winding. When in state A, the peak current reaches a maximum of A amps and a minimum of −A amps; when in state B, the peak current reaches a maximum of B amps and a minimum of −B amps. During the first half cycle illustrated in FIG. 6, the switching device is in state A, causing the current waveform 620 to peak at a maximum current of A amps. In the following four half cycles, the switching device is in state B, causing the current waveform 620 to peak at a maximum of B amps and a minimum of −B amps. Note that the duration of each half cycle is equal to half of the inverse of the AC voltage source frequency (e.g., $\frac{1}{120}$ seconds for a 60 Hz AC source). When time-averaged, switching in accordance with the switching pattern 610 produces the one-fifth fractional increase in power output between state B and state A.

Note that the switching pattern 610 alternates between state A and state B at the half cycles to effect ZCS. For example, after the first half cycle, the switch from state A to state B occurs when the current waveform 620 is zero. In this manner, switching losses are eliminated (or reduced), RFI is reduced, and other possible deleterious effects are mitigated.

Figure 7:
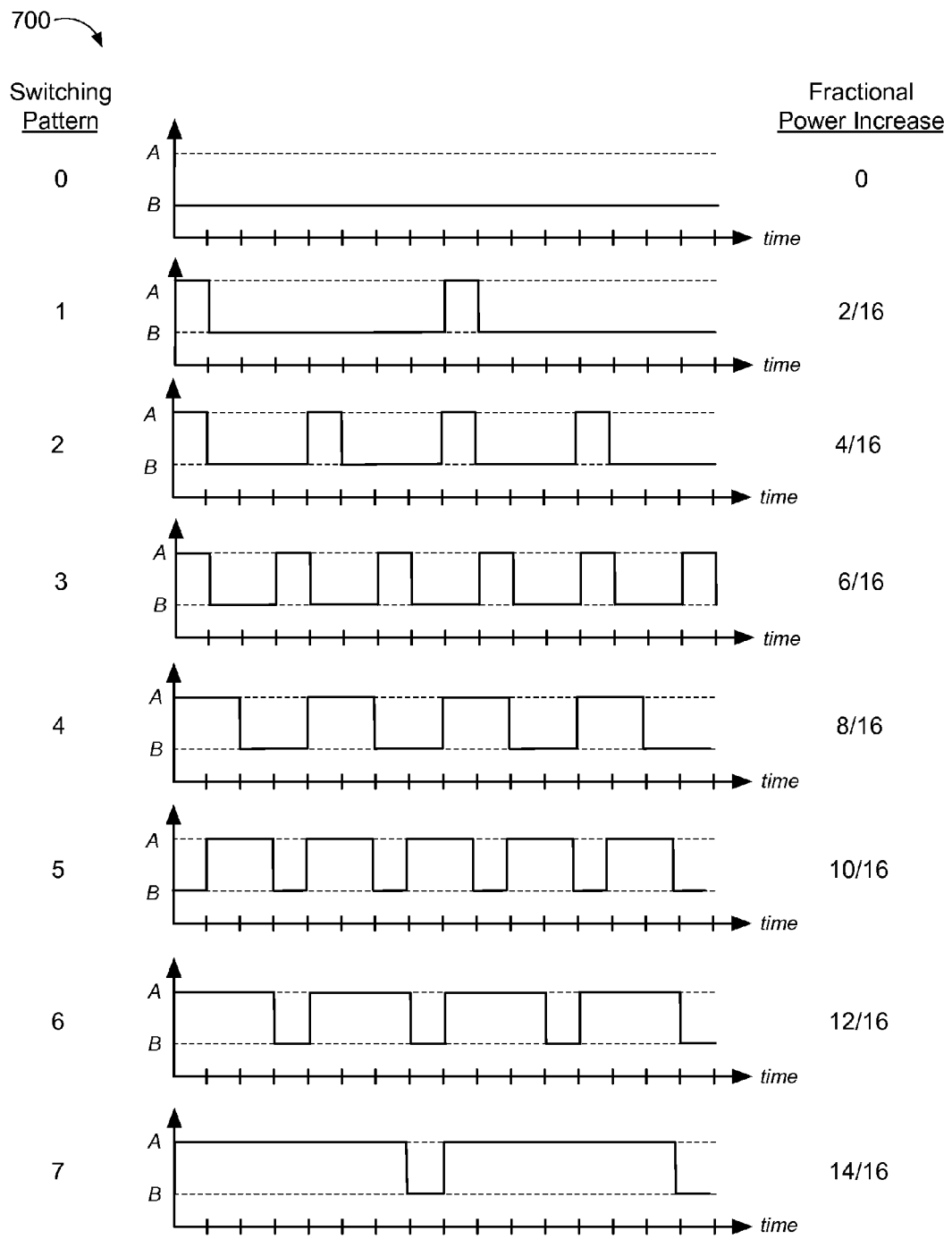
FIG. 7 is a graphical depiction of example switching patterns, according to an example embodiment.

FIG. 7 is a graphical depiction 700 of eight example switching patterns, according to an example embodiment. Each switching pattern represents an example waveform that represents a duty cycle corresponding to a particular fractional power increase. For example, switching pattern 3 represents a waveform in which, out of every 16 half cycles, the motor is in state A for 6 half cycles, and in state B for the remaining 10 half cycles (thereby effecting a fractional power increase of $\frac{6}{16}$).

Note that "switching pattern" as described herein may or may not involve switching while in effect (although, switching may be required to begin carrying out a particular static switching pattern). For example, switching pattern 0 is simply a constant state B. However, if previously in state A, switching may be performed to begin switching pattern 0. The term "switching pattern" may encompass such constant-state switching patterns.

It should be understood that other switching patterns not expressly described herein or explicitly illustrated in the figures may also be utilized, without departing from the scope of the present application. Certain switching patterns may switch at points in time beyond the half cycle (i.e., zero current) points in time. Other switching patterns may be more complex, involving three or more states. Furthermore, switching patterns may extend for fewer or greater than 16 half cycles, depending upon the particular implementation. A variety of switching patterns may be used to effect various output power levels.

What is claimed is:

1. An electric motor comprising:
a conductive winding including a plurality of turns, a first terminal, a second terminal, and a third terminal, wherein a first number of the plurality of turns are between the first terminal and the third terminal, a second number of the plurality of turns are between the second terminal and the third terminal, and the first number is different from the second number;
a switching device configured to selectively conduct power from the AC source to the first terminal in a first state and the second terminal in a second state, wherein, with the switching device in the first state, the conductive winding generates a first magnetic field responsive to the AC source conducting power to the first terminal, and wherein, with the switching device in the second state, the conductive winding generates a second magnetic field responsive to the AC source conducting power to the second terminal;

a rotor configured to magnetically interact with the first and second magnetic fields generated by the conductive winding such that a torque is applied on the rotor; and a controller configured to:
  determine a metric indicative of a load condition of the electric motor; and
  based on the determined metric, cause the switching device to switch between the first state and the second state one or more times.

2. The electric motor of claim 1, wherein the load condition is a power factor indicative of a ratio between power delivered to the conductive winding and power consumed by the load, and wherein the controller is further configured to:
  determine the power factor based on one or more sensor measurements;
  determine that the power factor is within a threshold range; and
  responsive to the determination that the power factor is within the threshold range, cause the switching device to switch between the first state and the second state one or more times.

3. The electric motor of claim 2, wherein, to determine the power factor, the controller is further configured to:
  determine a phase angle between a voltage delivered to the conductive winding and a current flowing through the conductive winding; and
  determine the power factor based on the phase angle.

4. The electric motor of claim 3, wherein determining the phase angle comprises:
  determining a first time at which the voltage delivered to the conductive winding is zero;
  determining a second time at which the current flowing through the conductive winding is zero; and
  determining the phase angle based on a difference between the second time and the first time.

5. The electric motor of claim 2, wherein causing the switching device to switch between the first state and the second state one or more times comprises:
  causing the switching device to alternately switch between the first state and the second state in accordance with a switching pattern, wherein the switching pattern indicates a rate of switching between (i) the first state and (ii) the second state.

6. The electric motor of claim 5, wherein the controller is further configured to:
  receive, from an input device, a selection of a particular predetermined switching pattern from among a plurality of predetermined switching patterns; and
  cause the switching device to alternately switch between the first state and the second state in accordance with the particular predetermined switching pattern.

7. The electric motor of claim 5, wherein the controller is further configured to:
  select, from among a plurality of predetermined switching patterns, a particular predetermined switching pattern based on the determined power factor; and
  cause the switching device to alternately switch between the first state and the second state in accordance with the particular predetermined switching pattern.

8. The electric motor of claim 5, wherein a first amount of power is delivered to the conductive winding when the switching device is in the first state, a second amount of power is delivered to the conductive winding when the switching device is in the second state, and a third amount of power between the first amount and the second amount is delivered to the conductive winding when the switching device operates in accordance with the switching pattern.

9. The electric motor of claim 1, wherein the controller is further configured to:
  cause the switching between (i) the first state and (ii) the second state to occur when no current is flowing through the conductive winding.

10. The method of claim 1, wherein the load is the rotor, wherein the electric motor further comprises a tachometer configured to detect a frequency of rotation of the rotor, and wherein determining the metric comprises:
  measuring, via the tachometer, the frequency of rotation of the rotor; and
  determining the metric as a ratio between the frequency of rotation of the rotor and a reference frequency of rotation.

11. A method of regulating an amount of power delivered to a load via magnetic induction by a conductive winding comprising:
  causing the conductive winding to generate a first magnetic field having a first strength by energizing a portion of the conductive winding from an alternating current (AC) source;
  determining a metric indicative of a ratio of power between (i) power delivered to the conductive winding from the AC source and (ii) power consumed by the load;
  determining that the metric is within a threshold range; and
  responsive to the determination that the metric is within the threshold range, causing the conductive winding to generate a second magnetic field having a second strength, wherein the first strength is different from the second strength.

12. The method of claim 11, wherein the portion of the conductive winding is a first portion including a first number of turns, and wherein causing the conductive winding to generate a second magnetic field comprises:
  energizing a second portion of the conductive winding from the AC source, wherein the second portion includes a second number of turns, and wherein first number of turns is different from the second number of turns.

13. The method of claim 11, wherein the AC source is a first AC source having a first voltage level, and wherein causing the conductive winding to generate a second magnetic field comprises:
  energizing the portion of the conductive winding from a second AC source, wherein the second AC source has a second voltage level, and wherein the first voltage level is different from the second voltage level.

14. The method of claim 11, wherein causing the conductive winding to generate a second magnetic field comprises:
  causing the conductive winding to, over a predetermined duration, alternately (i) generate the first magnetic field for a first period of the predetermined duration and (ii) generate a third magnetic field having a third strength for a second period of the predetermined duration.

15. An apparatus for regulating an amount of power provided to an electric motor comprising:
  a switching device configured to selectively conduct power to a conductive winding of the electric motor from (i) a first AC source having a first voltage level in a first state and (ii) a second AC source having a second voltage level in a second state, wherein the first voltage level is different from the second voltage level, wherein, with the switching device in the first state, the conductive winding generates a first magnetic field having a first strength, wherein, with the switching device in the second state, the conductive winding generates a second magnetic field having a second strength, and wherein the first strength is different from the second strength;

a rotor configured to magnetically interact with magnetic fields generated by the conductive winding such that a torque is applied on the rotor; and a controller configured to:
determine a metric indicative of a ratio of power between power delivered to the conductive winding from the AC source and power consumed by the load;
determine that the metric is within a threshold range; and
responsive to the determination that the metric is within the threshold range, cause the switching device to switch between the first state and the second state one or more times.

16. The apparatus of claim 15, wherein the second AC source is an output of a step-down transformer configured to reduce a voltage of the first AC source.

17. The apparatus of claim 15, wherein determining the metric comprises:
determining a phase angle between a voltage delivered to the electric motor and a current flowing through the electric motor; and
determining the metric as a power factor based on the phase angle.

18. The apparatus of claim 15, wherein the controller is further configured to:
responsive to the determination that the metric is within the threshold range, cause the switching device to alternately switch between the first state and the second state in accordance with a switching pattern, wherein the switching pattern indicates a rate of switching between (i) the first state and (ii) the second state.

19. The apparatus of claim 18, wherein the controller is further configured to:
cause the switching between the first state and the second state to occur when no current is flowing through the conductive winding.

20. The apparatus of claim 18, wherein the controller is further configured to:
select, from among a plurality of predetermined switching patterns, a particular predetermined switching pattern based on the power factor; and
cause the switching device to alternately switch between the first state and the second state in accordance with the particular predetermined switching pattern.

* * * * *